Nov. 4, 1930.                    E. WILLIAMS                    1,780,325
TREPAN TOOL WITH RADIAL CAGE, CUTTER, AND GUIDE
Filed Oct. 16, 1926          3 Sheets-Sheet 2
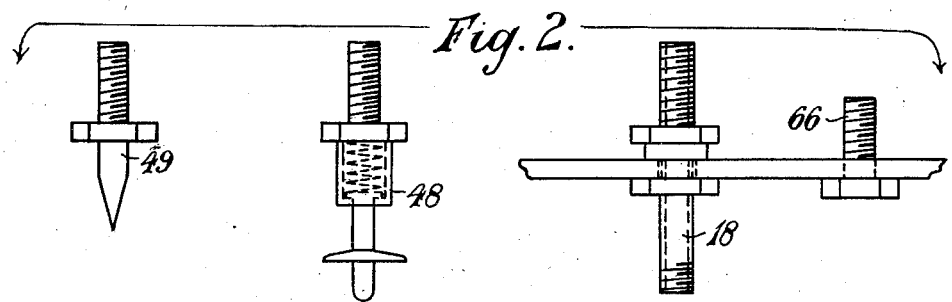
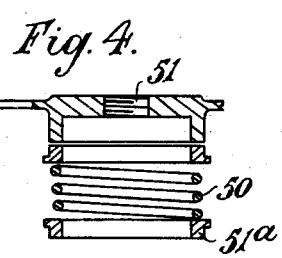
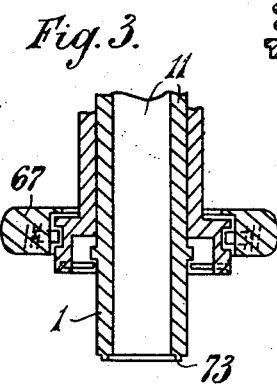
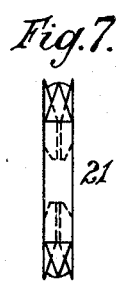
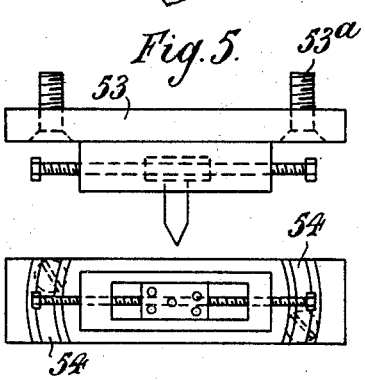
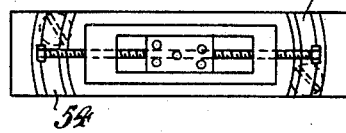
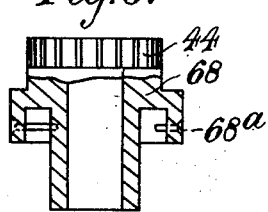
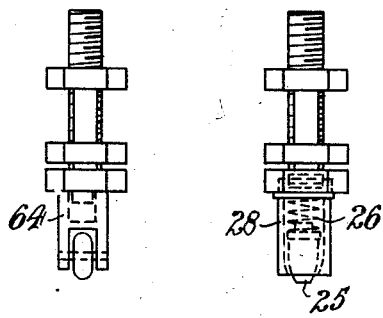
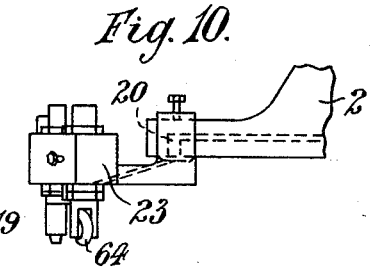

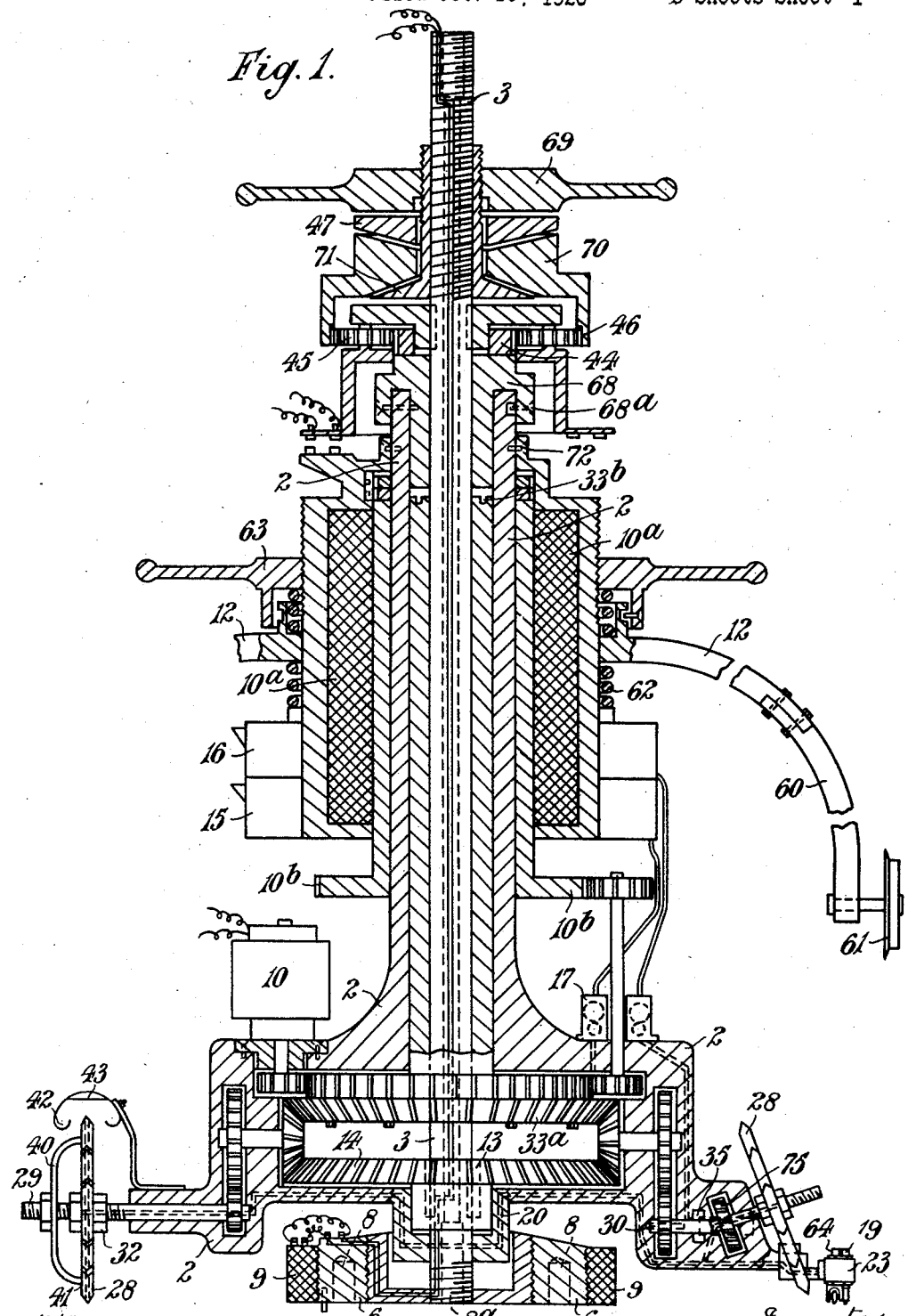
Nov. 4, 1930.  E. WILLIAMS  1,780,325
TREPAN TOOL WITH RADIAL CAGE, CUTTER, AND GUIDE
Filed Oct. 16, 1926  3 Sheets-Sheet 1

Nov. 4, 1930. E. WILLIAMS 1,780,325
TREPAN TOOL WITH RADIAL CAGE, CUTTER, AND GUIDE
Filed Oct. 16, 1926 3 Sheets-Sheet 3
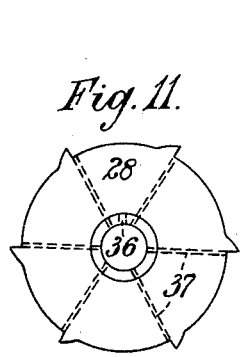
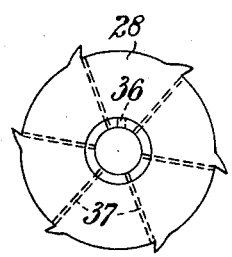
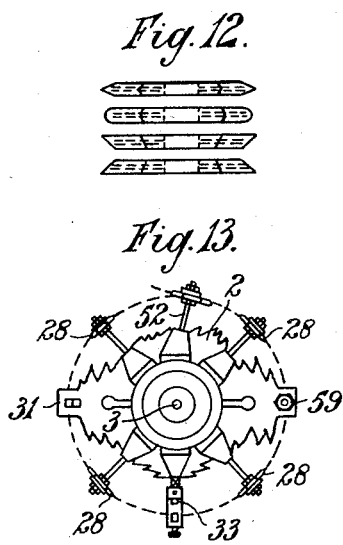
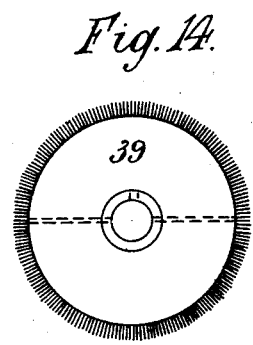
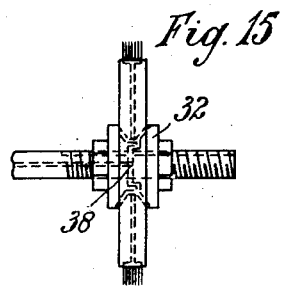
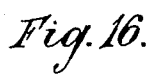
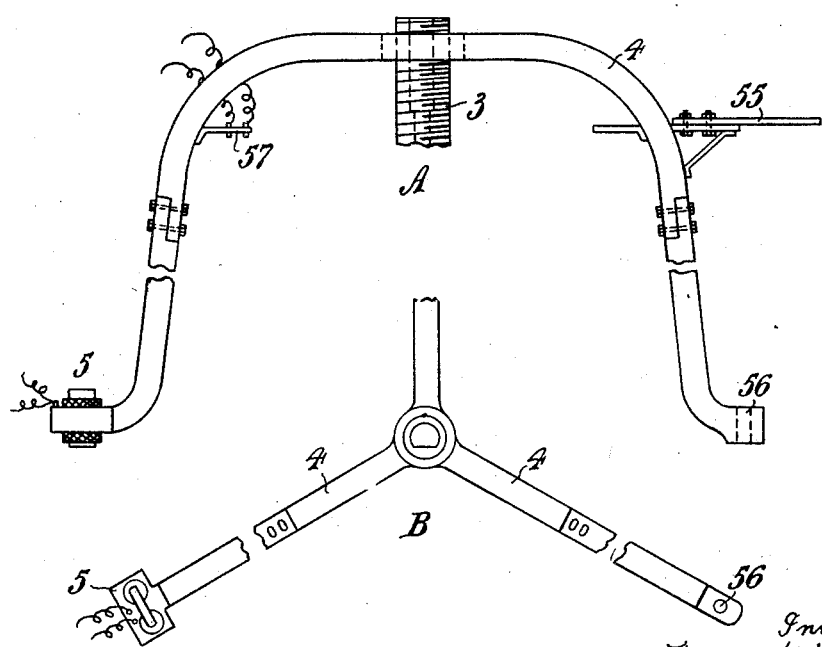

Patented Nov. 4, 1930

1,780,325

UNITED STATES PATENT OFFICE

ERNEST WILLIAMS, OF STONE, ENGLAND

TREPAN TOOL WITH RADIAL CAGE, CUTTER, AND GUIDE

Application filed October 16, 1926, Serial No. 142,131, and in Great Britain October 29, 1925.

The invention is a trepan tool, with radial cage, for trepanning any substance or material. It is a rotary like body, trepanning as it moves or rotates over a surface, by self-contained motive power or by power externally supplied, or attached to and driven or rotated in one mass by any external means or power, with a detachable cutter or cutters, and with detachable external and internal adjustable guide or guides, roller faced, or like railway wheels, or in solid form, they are radially caged and attached to the said rotary body.

The trepan tool may rotate and travel and trepan in different ways and may have detachable fitments or attachments to control and attach the said tool, according to the nature and shape and position of the material or substance to be trepanned. For instance— in trepanning wood high speed is wanted and cooling may not be necessary and soft substance would require a different means of attachment to metal. In certain cases of light work the tool may be held and rotated by hand and not be fixed to the material in any way. Brass or soft metal would require different fitments and means of attachment to that of hard steel. In some cases of trepanning it may be necessary to leave a bevel edge on the material and in other cases a very square edge may be necessary. In each case the detachable roller or wheel guides, when being used, may rotate on free axles or pivots and placed and set at any angle in relation to the axis of main body, and would be shaped to correspond and set to take up their exact position accordingly, and the rotary wheel cutters may rotate at different angles, one in relation to the other and rotate in any direction or at any angle in relation to the main axial body. The said invention always trepanning with the same principle, the cutter or cutters radially caged. One or any number of radially caged rotary wheel cutters may be used for the said trepanning. Common rotary wheel cutters may be used or amplifying rotary wheel cutter or cutters may be used, all cutters may be cooled by a coolant carried in self-contained form in the body of the tool or externally supplied and radially discharged during rotary movement of the said radially caged body. The said rotary wheel cutters may work in unity and cut the same path or may be used singly or otherwise.

A free wheel may be fitted on the base of the tool to control direction of rotation.

In some cases the trepan tool may have its own axis fixed to the material to be trepanned and the tool revolve on the said axis, or it may rotate in one mass on its own pivot axis or otherwise.

Brushes, rotary and otherwise, may be used and fitted to the main body and rotate with the main body for sweeping away cuttings and keeping the path of cutters and guides clean whilst trepanning.

The internal gearing within the radial cage and bearings and shafts of cutters and hollow cutters and guides and rotary brushes may be supplied with lubricant by regulated mechanical means in one form, from a detachable oil tank and oil pump driven and attached to the radial cage body through the hollow shafts or casing. In another form it may be externally supplied. In another form solid blocks of lubricant like blocks of soap rubbing on the surface of trepanning material and trepan tool may have forced lubrication to all parts including teeth of cutters.

One form of the invention is illustrated in the accompanying three sheets of drawings.

Fig. 1 is a general view, sectional elevation showing structure of invention.

Fig. 2 shows three types of detachable centre points.

Fig. 3 shows one form of detachable external coupling for flexible shaft and the like, when power is externally supplied.

Fig. 4 shows adjustable spring control for cutter feed.

Fig. 5 shows sliding adjustable swivelling centre point.

Fig. 6 shows housing coupling interchangeable with Fig. 3.

Fig. 7 shows amplifying teeth of cutter grouped as one cutter.

Fig. 8 shows detachable depth guides.

Fig. 9 shows mechanical lubricator.

Fig. 10 shows depth guide and lubricator mounted in tool holder.

Fig. 11 shows two forms of rotary cutter with channels for lubricant.

Fig. 12 shows group of four rotary amplifying cutters.

Fig. 13 shows plan of tool showing cutters and guides mounted in position.

Fig. 14 shows rotary wire brush.

Fig. 15 shows one method of mounting rotary cutter or brush on hollow driving shaft.

Fig. 16 shows external non-rotating carrier guide.

(A) *Elevation.* (B) *Plan*

The structure is a rotary or rotary like radial cage body (2) with a cutter or cutters and a guide or guides, radially caged therein or thereon. When the tool rotates on its own axis (3) one or both ends of the said axis to be made a fixture to the material to be trepanned. One end of the said axis (3) has a detachable non-rotating external carrier guide (4, Fig. 16). The other end of axis (3) to have a platform (6, Fig. 1) detachable or otherwise to bed on the centre of said material, the said platform may have projections (7) or recesses (8) to receive detachable centre point (18, Fig. 2), bolts or studs, (66) and attachments to prevent rotation and for fixing the trepan tool to the said material, with one or any number of electro-magnets (9). The main radial cage body (2) may have attached or fixed to it gears and shafts radially caged, driven by hand or power mechanism rotating the said body (2), and all thereon attached, trepanning as it moves over the surface of the material or substance engaged upon. The power for working the said tool may be by one or any number of motors or the like,—two being shown, (10 and 10A)—in self-contained form, or power may be externally supplied, or power unit may be externally attached. The motor (10A) has an armature that is built on a hollow axis or tube, the said armature fits and rotates over main body (2), said armature being connected to gearing (10B) or the like to the cutters. The motor shell may be detachable and fitted to the main body (2) by screws or the like. One kind of external power coupling attachment is shown (11, Fig. 3) with free wheel ratchet attachment for hand grip (67), interchangeable with housing (68, Fig. 1) dogs (73) engaging with recess (33B, Fig. 1). I do not confine myself to this particular form of coupling when using external motive power, but may use any suitable form of transmission. I do not confine myself to one form of motor power only, any common kind of motive power may be used, with any common kind of gearing and attachment, in self-contained form rotating with the trepan tool or externally attached, or the tool may be rotated as one mass by any form of external means. The tool may be composed of one or any number of bodies, three being shown. One body (12) to carry the floating guiding wheels (61). The second main sliding rotary body (2) radially caged to carry the cutters, shafts and gearing and other attachments. The third axial body (3) to form a centre for the tool to revolve on or revolve with. The said axis (3) may be keyed (13) to the gear wheel (14) in a sliding detachable manner. I do not confine myself to this particular method of bearings, gearings or couplings connecting the bodies and axis and shafts, but may use any suitable common form of bearing, gearing and coupling. The trepan tool may have its own oil (15) and cooling (16) supply tanks, self-contained and may be connected to pumps (17) or the like, built in and driven within the body for regulation of discharge.

Said tanks or cutters may be externally supplied through the detachable hollow axis (3) and hollow pivot (18, Fig. 2) attached to platform (6) in recesses (8A) and connected to channels (20, Fig. 1) or the like in or on the main radial cage body (2).

The adjustable tool holders (23) and sockets may have grooves, channels and portholes (24, Fig. 10) to correspond with channels (20, Fig. 1) in main radial cage body (2), to receive cooling fluid or substance for discharge on cutting surface path of material and cutting edge of cutters.

One form of forced lubrication to the cutters and cutting path will be in solid form, blocks of lubricant like soap, (25, Fig. 9) bar pattern, mounted and sliding in a holder (26) in sockets (19, Fig. 10) and kept in position by springs (27) or the like for frictional contact and so pressing on the cutting surface to be trepanned as the trepan tool moves over the surface of trepanning.

The rotary wheel cutter (28, Figs. 1, 11, and 12) is mounted on an axle shaft (29) or spindle (30), one or any number of shafts and cutters may be fitted radially and used, and one or any number of cutters may be used at any one time, they may be mounted on axle-shafts (29) in a sliding variable manner by means of threads and nuts (32) for adjustment of the distance of cutter (28) to the centre of rotation or pivot axis, and so vary the bore of trepan, by varying the distance of the cutter (28) from the centre of rotation (3) or pivot. Rotary wheel cutters (28) may be rotated by one or two motions, the first motion, the cutter (28) and shafts (29) being carried on or in the radial cage main body (2) and rotated freely within that body (2) by removing gear wheel (14) or the locking sliding key (13) and allowing all internal gearing to run free. The second motion is caused by the main radial cage body (2) being geared to the power unit (33) and being geared to the driving-shafts (29) carrying the rotary cutters at the same time, and so they receive two rotary movements simultaneously, at any speed desired according to their gear ratio within the main radial cage body (2) which carries them one in relation to the other. I do not confine myself to always use two motions for the rotary wheel cutter (28), said cutter may be driven direct from the central gear (33A) within the main radial cage body and the said main body (2) may be revolved by hand or other means. This may be done by allowing all gearing and central axis (3) to rotate within the main radial cage body (2). Cutters (28) and shafts (29) or spindles (30) may be set and rotated at any designed angle in relation to the central axis (3) and the main radial cage body (2) and at different angles, one in relation to the other according to the requirements of material or substance being trepanned, by using common worm gearing (75, Fig. 1) or the like. Said cutters (28) may revolve with shafts (29) or on spindles (30) in any direction in relation to the main radial cage body and their directions may be reversed one in relation to the other by the use of lay shafts (35) and the like. The rotary wheel amplifying cutters (28) will be radially caged and each may have their own separate surface to cut according to their shape and position whilst rotating in the same path or groove. The teeth being shaped for a definite numerical position one in relation to the other and placed in rotation in an amplifying and enlarging manner, with a keyway (36) or hollow recess (36) cut in a definite recording position on each cutter. Each cutter having a definite relation one to another, and so definitely place the cutting edge of one cutter to correspond with the designed amplifying cutting edge position of the next cutter, when placed on driving shaft (29) or spindle (30), all trepanning and travelling in their appointed path and cutting in stages making one groove or path in an amplifying manner all being mounted in the rotary body radially caged (2) and rotated in unity. For example—first cutter, pointed groover—second cutter, round groover—third cutter, right angle groover—fourth cutter, left angle groover.

I do not confine myself to the use of four amplifying rotary cutters to cut or trepan one complete stage of amplification, one or any number of cutters may be used to produce one amplifier or one complete stage of amplification and one or any number of amplifying sets may be used at the same time. I do not confine myself to the use of amplifying cutters only, common rotary cutters or compound cutters with or without teeth may be used, made of composition or metal. Rotary wheel cutters may be slotted, grooved or drilled (37, as at Fig. 11), radially to form channels or portholes to correspond with channel portholes on hollow shafts (38, Figs. 1 and 15) to receive the cooling substance and lubrication for escapement and discharge by centrifugal force or pressure at the radial surface of cutters and the face of material engaged upon. The cutter wheels (28) may be fitted with interchangeable flat faced discs (40) dome shaped or otherwise, of various sizes to act as a shoulder or flange (41) to the cutter (28) and so form a safety depth gauge (40). Cutters (28) may be detachable for easy removal so that one only may be used as a master cutter, or a set of amplifiers may be mounted on one shaft as a master cutter when desired, by setting the teeth in amplifying order, or using one cutter only with amplifying teeth (21, Fig. 7). Shields (42, Fig. 1) may be placed over cutters (28) with vanes underneath (43) to collect substance and cause reactance of radial discharge and cooling face of cutters.

Trepan tool may have many ways for regulating depth of cut taken by cutters and many ways of supplying and controlling the necessary pressure for cutters on the face of material being trepanned, that is—advancing the cutters in relation to the engaging material being trepanned. One of the said means is in self-contained form self-advancing by mechanical means, the gear wheel (44) and housing (68) may be attached by threads, pins or the like (68A) to the main radial cage body (2) and connected to same by pinion (45) to the external housing which is internally geared (46) which is attached to the axis by threads. The said gear wheel (44) and external housing (46) so being connected together by reduction gearing or the like.

A clutch (47) may be placed between gear (46) and axis (3) hand controlled, or otherwise, for engagement and so control the gearing of the main radial cage body, by turning threaded wheel or the like, (69, Fig. 1) moves the clutch flange ring (47) until flanges (70 and 71) are gripped as one. That is, you slide the rotary body carrying the cutters on the axis by mechanical means, so varying the depth of the main radial cage body in relation to the axis (3) and the engaging material so advancing the depth of cutters by reduction gearing at a fixed ratio per revolution or movement of the trepan tool. I do not confine myself to this particular kind of clutch and gearing, but may use any suitable kind of common clutch and gearing. When axis (3) is not attached to the material to be trepanned another form of pressure feed for cutters is externally applied by hand using a detachable pivot centre (48, Fig. 2) with a spring base or otherwise or solid pivot (49). Another form of cutter feed may be a spring (50, Fig. 4) adjustable, by threaded control cap (51) or otherwise, placed between the rotary body and body fixed or attached to the material to be trepanned, so keeping a constant pressure on the cutting face of cutters and material being trepanned.

During rotary movement of the trepan tool, driving shafts and cutters and main radial cage body will rotate one in relation to the other according to their respective gear ratios and gears engaged. Rotary brushes, (39, Fig. 15) spiral shaped or otherwise, for keeping the cutting path clean may be used and may be detachable and mounted on driving shafts like rotary cutters. Scraper brushes may be fitted in the main rotary radial cage body of the trepan tool with fittings interchangeable with the guides.

The driving shafts that rotate or the spindles that carry the cutters may be placed and set off-set (52) from the axial centre of main radial cage body to so advance or retard the cutter in relation to the true circle of travel according to the requirements of the material engaged upon and clearance required. That is—in some cases of trepanning it will be necessary for the rotary wheel cutters (28) to rotate with their driving shafts centres (52) out of alignment with the true central axis (3) on which the tool moves or rotates. The trepan tool may be adjustable in another form—the main platform (6) on centre axis (3) to have a series of holes or recesses (8) to receive detachable pivot centres (48 and 49) each hole (8) to have a definite numerical relation to the bore trepanned, that is—each hole engaged by pivot centre would vary the distance of the cutter to the pivot centre and so vary the bore of surface cut, when using one master cutter only. Centre pivot axis (49) maybe fitted with an adjustable sliding table (53, Fig. 5) with swivel movement (54) or otherwise, fixed to the axial centre platform (6) of the main radial cage body of the tool and to slide in all directions and carry with it the detachable centre pivot axis, and so vary the distance from the pivot axis to the cutter, and so vary the bore of trepanning. The said swivel (54) giving the rotary cutter an artificial off-set rotary centre at any angle in relation to the rotary axial (3) centre of tool. The dome shaped, non-rotating carrier guide (4) may have bracket extensions (55) Fig. 16, with arms or legs at one end with hollow recesses to receive detachable fitments (56), bolts and screws and the like and electro-magnetic fixtures (5) for fixing trepan tool externally on or outside of the surface of the material to be trepanned. The other end of dome may be attached to the central main axis (3) and act as a controller and central guide, the said external non-rotating carrier guide (4) may carry electric brushes (57) and collecting gear and electric switches and power unit attachment as required.

In certain cases of trepanning, when a certain depth has been trepanned by using a pivot centre as a bearing, it may be necessary to relieve the central portion of material or substance of the pressure of the trepan tool on pivot axis, this may be done by removal of the detachable centre point (49) pivot axis and lowering the detachable external radially caged floating carrier body (12) with arms or legs (60) and roller guides (61) which may have flanges and faces like railway wheels (61) to act as guides and keep trepan tool central, floating on free axis, half the wheel— the flange portion to travel in the newly cut groove as made by the cutters when rotated or moved in the path as cut by the cutters. The other portion—the flat part of the wheel to bed and travel on the external surface of trepanning and so carry the weight and pressure and so control the depth of cut taken by cutters, by varying the position of the main radial cage body (2) carrying the cutters in relation to the carrier body (12), being adjustable by spring pressure (62) and threaded cap (63) carrying the said external guiding wheels (61) bearing on the surface of trepanning material, by hand pressure or the like, and so act as a carrier and guide for the main radial caged body (2). Another kind of guide is a depth gauge guide (64, Figs. 1, 8, and 10) radially caged, one or any number may be fitted radially (59 and 31, Fig. 13) in the main rotary body (2) or in adjustable holders (23) attached to the main rotary body. The said depth guides may be with or without rollers, any shape or angle and to travel on the surface in the cutting path of the newly cut material or otherwise and so act as a guide and safety depth gauge for the cutters, and so control depth of cut taken by cutters, each movement of the surface travelled, and so making the trepan tool and cutters self-acting or self-feeding, if desired.

The said guides may be detachable and adjustable for any depth or position in relation to the cutter and the main radial cage body (2) of the trepan tool and so control depth of common cutting or amplifying cutting.

I claim:

1. A trepan machine for making annular cuts in any material comprising a radial cage, means for making a circular cut carried by said radial cage, means for rotating the cutting means, means for guiding the cutting means, and means for rotating the cutting means at an angle in relation to the radial cage.

2. A trepan machine for making annular cuts in any material comprising rotary cutters, a radial cage adapted to support said cutters, a central axis upon which is mounted the radial cage, means for rotating said cutters, means for guiding the cutters in a circular path, means for rotating the cutters at an angle in relation to the radial cage, means for operating the radial cage and means for supporting the central axis on the work.

3. A trepan machine for making annular cuts, comprising a plurality of rotary cutters, a radial cage therefor, radially disposed spindles rotatably mounted in said cage, each spindle having secured thereto a rotary cutter, a central axis upon which is rotatably mounted the radial cage, means for rotating said cutters, means for guiding the cutters in a circular path, means for rotating the cutters at any angle in relation to the radial cage, means for operating the radial cage, and means for supporting the central axis on the work.

4. A trepan machine comprising a plurality of rotary cutters, a radial cage therefor, radially disposed spindles rotatably mounted in said cage, each supporting a rotary cutter, a pinion fixed to the end of each said spindle within the cage, countershafts mounted in bearings in said cage, a gear wheel provided in the respective ends of each countershaft, engaging with said pinion on the rotary cutter spindle, and meshing with a crown wheel carried by said radial cage, means for rotating said cutters, means for guiding the cutters in a circular path, means for rotating the cutters at an angle in relation to the radial cage, means for varying the speed of the radial cage, and means for supporting the central axis on the work.

5. A trepan machine comprising a plurality of rotary cutters, a radial cage therefor, radially disposed spindles attached, carrying the cutters mounted in said cage, a pinion attached onto each spindle within the radial cage, countershafts carried by said radial cage, a pinion and toothed gear on the respective ends of each countershaft, said pinion meshing with the pinion on the rotary cutter spindle, the toothed gear meshing with a crown wheel secured within the radial cage, a pinion keyed thereto, electric motors having their driving shafts engaging with said pinion rotating said cutters, means for guiding said cutters in a circular path, means for rotating the cutters at an angle in relation to the radial cage, means for varying the speed of the radial cage and means for supporting the central axis on the work.

6. A trepan machine comprising a plurality of rotary cutters, a radial cage having the lower part formed with an enlarged annular chamber, radially disposed spindles supporting the cutters mounted in said cage, a pinion fixed to each spindle, countershafts carried within said cage, gears integral therewith, a crown wheel carried by said radial cage, said crown wheel rotating the cutters through the countershafts, a pinion keyed to the radial cage, an electric motor, a pinion on the shaft of the motor engaging with said pinion rotating said cutters, a floating carrier body surrounding the radial cage, guides carried by said floating carrier body guiding the rotary cutters in a circular path, means for rotating the cutters at an angle in relation to the radial cage, means for varying the speed of the radial cage, and means for supporting the central axis on the work.

7. A trepan machine comprising a plurality of rotary cutters, a radial cage therefor, radially disposed spindles mounted in the lower end of said cage supporting the cutters, countershafts carried within said radial cage, gear wheels carried by said spindles and countershafts respectively, a crown wheel carried by the radial cage engaging with the countershafts, an armature provided on the upper end of said radial cage, a floating carrier on the periphery of the yoke of the motor, guides carried by said floating carrier guiding the cutters in a circular path, a pinion on the end of said armature engaging with the pinion on the radial cage through a countershaft, an electric motor, the driving shaft thereof meshing with said pinion on the radial cage, an abutment gear secured to the central axis and geared to the countershafts, said motors rotating the cutters and radial cage respectively, means for varying the speed of the radial cage, and means for supporting the axis on the work.

8. A trepan machine comprising a plurality of rotary cutters, a radial cage therefor, radially disposed spindles therein, each supporting a cutter, a differential gear within said radial cage, said differential gear rotating the cutters and radial cage respectively, a pinion secured to said radial cage, electric motors having their shafts connected by gearing to said pinion rotating the cutters, and radial cage, a floating body, guides thereon, said floating body guiding the rotating cutters, a reduction gear provided at the upper end of said radial cage, a clutch mechanism engaging the reduction gear with said radial cage for varying its speed, means for rotating the cutters at an angle in relation to the radial cage and means for supporting the central axis stationary.

9. A trepan machine comprising a plurality of rotary cutters, a radial cage therefor, radially disposed spindles therein, each supporting a cutter, a differential gear within said radial cage, said differential gear rotating the cutters and radial cage respectively, a pinion secured to said radial cage, electric motors having their shafts connected by gearing to said pinion rotating the cutters and radial cage, a floating body, guides thereon, said floating body guiding the rotary cutters, a reduction gear provided at the upper end of said radial cage, a clutch mechanism engaging the reduction gear with said radial cage for varying its speed, skew gearing provided within said radial cage for rotating the cutters at an angle in relation to the radial cage and means for securing the central axis stationary.

10. A trepan machine comprising a plurality of rotary cutters, a radial cage therefor, radially disposed spindles therein, each supporting a cutter, a differential gear within said radial cage, said differential gear rotating the cutters and radial cage respectively, a pinion secured to said radial cage, electric motors having their shafts connected by gearing to said pinion rotating the cutters and radial cage, a floating body, guides thereon, said floating body guiding the rotary cutters, a reduction gear provided at the upper end of said radial cage, a clutch mechanism engaging the reduction gear with said radial cage for varying its speed, skew gearing provided within said radial cage for rotating the cutters at an angle in relation to the radial cage, a stationary platform on the base of said central axis, electro-magnets surrounding said platform for securing the machine to the work.

11. A trepan machine comprising a single rotary cutter, a radial cage therefor, tooth gearing provided within and carried by said radial cage, a central driving shaft forming the axis for the radial cage rotating the cutter through said tooth gearing in self contained form.

12. A trepan machine comprising a rotary cutter, a radial cage therefor, tooth gearing provided within and carried by said radial cage, a central driving shaft forming the axis for the radial cage rotating the cutter through said tooth gearing in self contained form, and said cutter rotating independent of said radial cage.

13. A trepan machine comprising a plurality of rotary cutters, a radial cage therefor, a gearing within said radial cage, driving means adapted to rotate the rotary cutters and radial cage independently of each other through said gearing, an adjustable tool holder carried by said radial cage, and a reduction gear varying the speed of said radial cage.

14. A trepan machine comprising a plurality of rotary cutters, a radial cage therefor, a gearing within said radial cage, driving means adapted to rotate the rotary cutters and radial cage independently of each other, through said gearing, an adjustable tool holder carried by said radial cage, a reduction gear for varying the speed of said radial cage, and means provided for automatically lubricating the mechanism.

15. A trepan machine comprising a plurality of rotary cutters, a radial cage therefor, a detachable rotary wheel amplifying cutter or cutters rotated at an angle to the axial centre of rotation, a gearing within said radial cage, driving means adapted to rotate the rotary cutters and radial cage independently of each other, through said gearing, an adjustable tool holder carried by said radial cage, and means provided for automatically lubricating the mechanism.

16. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, and a detachable centre provided on the machine on which the tool rotates.

17. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, and means for advancing the radial cage forward.

18. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, means for advancing the radial cage forward, and a clutch to control the cutting means.

19. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, lubricating means carried by the radial cage, means for advancing the radial cage forward, a clutch to control the cutting means, and safety depth gauges carried by the cutters.

20. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, means for advancing the radial cage forward, a clutch to control the cutting means, safety depth gauges carried by the cutters, and detachable pan collectors carried by the radial cage.

21. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, means for advancing the radial cage forward, a clutch to control the cutting means, safety depth gauges carried by the cutters, detachable pan collectors carried by the radial cage, and clearing brushes carried by the radial cage.

22. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, means for advancing the radial cage forward, a clutch to control the cutting means, safety depth gauges carried by the cutters, detachable pan collectors carried by the radial cage, clearing brushes carried by the radial cage, automatic lubricating and cooling means and controlling pumps for said lubricating and cooling means.

23. A trepan machine comprising a plurality of rotary cutters, shafts integral therewith, a radial cage therefor, a gearing within said radial cage, driving means for rotating said cutters and radial cage through said gearing, an adjustable tool holder carried by the radial cage, a reduction gear for varying the speed of the radial cage, lubricating means carried by the radial cage, means for advancing the radial cage forward, a clutch to control the cutting means, safety depth gauges carried by the cutters, detachable pan collectors carried by the radial cage, clearing brushes carried by the radial cage, automatic lubricating and cooling means, and controlling pumps for said lubricating and cooling means, a pivot, on which the machine rotates and means for setting the pivot in any position.

24. A trepan machine comprising a plurality of rotary cutters, shafts integral therewith, a radial cage therefor, a gearing within said radial cage, an off-set driving shaft therein for rotating said cutters and radial cage through said gearing, an adjustable tool holder carried by the radial cage, a reduction gear for varying the speed of the radial cage, lubricating means carried by the radial cage, means for advancing the radial cage forward, a clutch to control the cutting means, safety depth gauges carried by the cutters, detachable pan collectors carried by the radial cage, automatic lubricating and cooling means and controlling pumps for said lubricating and cooling means, a pivot, on which the machine rotates and means for setting the pivot in any position.

ERNEST WILLIAMS.